United States Patent [19]

Werts

[11] 4,147,269

[45] Apr. 3, 1979

[54] FUEL OIL STORAGE TANK

[76] Inventor: David A. Werts, 8722 Lakefront Dr., Richmond, Va. 23229

[21] Appl. No.: 851,023

[22] Filed: Nov. 14, 1977

[51] Int. Cl.[2] ........................ B01D 21/10; B65D 87/06

[52] U.S. Cl. ........................................ 220/1 B; 137/546; 220/69; 220/DIG. 6

[58] Field of Search .................... 220/1 B, 5 A, 69, 14, 220/DIG. 6, DIG. 24; 137/544, 546

[56] References Cited

U.S. PATENT DOCUMENTS

| | | | |
|---|---|---|---|
| 480,264 | 8/1892 | Johnson | 137/546 X |
| 1,055,744 | 3/1913 | Hans | 220/DIG. 6 |
| 1,063,754 | 6/1913 | Weiss | 220/DIG. 6 |
| 1,235,438 | 7/1917 | Chynoweth | 220/DIG. 6 |
| 1,364,144 | 1/1921 | Roszkowski | 137/546 X |
| 1,608,226 | 11/1926 | Mauran | 220/DIG. 24 |
| 1,705,121 | 3/1929 | Jones | 137/546 X |
| 1,773,930 | 8/1930 | Athon | 220/5 A |
| 1,792,827 | 2/1931 | Farkas | 137/590 |
| 1,797,212 | 3/1931 | Kramer | 220/DIG. 24 |
| 2,001,610 | 5/1935 | Hildenbrand | 220/DIG. 6 |
| 2,037,022 | 4/1936 | Holby | 220/DIG. 24 |
| 2,339,303 | 1/1944 | Tillery | 220/DIG. 6 |
| 3,047,190 | 7/1962 | Bayer | 220/69 X |
| 3,212,824 | 10/1965 | Emery | 220/5 A X |
| 3,722,529 | 3/1973 | Arakawa | 137/546 X |
| 3,971,491 | 7/1976 | Mowatt-Larssen et al. | 220/69 X |

FOREIGN PATENT DOCUMENTS

| | | | |
|---|---|---|---|
| 1536174 | 10/1966 | Fed. Rep. of Germany | 220/DIG. 6 |
| 2519184 | 1/1976 | Fed. Rep. of Germany | 220/69 |
| 1360365 | 3/1964 | France | 220/1 B |

OTHER PUBLICATIONS pp. 42–45, Modern Plastics, Apr. 1977.

*Primary Examiner*—William Price
*Assistant Examiner*—Allan N. Shoap
*Attorney, Agent, or Firm*—Norman B. Rainer

[57] ABSTRACT

A cylindrical vessel of large size and integral molded construction is provided having a depressed well which accumulates sludge formed in the course of storage of hydrocarbon fuels. A hole positioned in the top of the vessel directly above said well permits insertion of a pipe which, by suction means, removed the accumulated sludge. Pedestal means, positioned below the tank and adjacent each end, causes the entire vessel to be tilted downwardly toward the well, thereby causing gravimetric migration of sludge toward the well.

6 Claims, 4 Drawing Figures

FUEL OIL STORAGE TANK

BACKGROUND OF THE INVENTION

This invention relates to improvements in large size vessels for the stationary storage of fuel oil and other liquids, and more particularly to large size rigid tanks provided with means for the accumulation and removal of sludge or other sedimentary impurities associated with liquids confined therein.

Liquid hydrocarbon fuels such as gasoline, kerosine, and heating oils such as bunker #2, have a tendency to form gel particles in the course of aging due to polymerization phenomena accelerated by residues of cracking catalysts. Such particles have an adverse affect on equipment intended for the utilization of the fuels, causing clogging of burner orifices or build-up on moving parts of control systems. Screen and strainer filters of various kinds have been disclosed for the removal of suspended impurities, but they are all of limited effectiveness because the particles fill the pores of the filter, necessitating frequent attention to prevent interruption of the flow of fuel. In stationary systems which permit quiescent storage, the particles eventually settle to the bottom of the confining vessel to form a sludge.

It has long been sought to devise methods and apparatus whereby sludge can be removed from storage vessels. However, this has proven to be a difficult accomplishment particularly because of the inaccessibility of the interior of storage vessels during use, and the fact that the vessels are generally of cylindrical configuration and horizontally disposed with respect to their longitudinal axis, causing a layer of sludge to traverse the entire lower portion of the vessel. Accessibility to the interior bottom portion of storage vessels is even more difficult when said vessels are located underground, as is the general case. The term "large size" as employed herein in intended to denote vessels having a volumetric capacity of between about 275 and 1,000 gallons.

Various designs have been proposed for small gasoline tanks utilized in automotive vehicles to facilitate sludge removal. Typical of such designs are those disclosed in U.S. Pat. Nos. 1,235,438; 2,339,303; 1,063,754; 1,792,827; 2,001,610; and 1,055,744. Said patents in general describe tanks having depressions or wells in their underside portion to cause accumulation of sedimentary material. However, the apparatus and techniques utilized for finally separating the collected impurities from the fuel are not amenable to practical use in the case of large stationary tanks.

It is accordingly an object of the present invention to provide a large vessel for the stationary storage of liquids and provided with means for the accumulation and removal of sedimentary material. It is another object of the present invention to provide a large vessel for the stationary storage of hydrocarbon liquids and provided with means involving no moving parts for the accumulation and removal of sedimentary material. It is a still further object of this invention to provide a large vessel of the aforesaid nature of simple and durable construction capable of easy installation and simple operational use. These objects and other objects and advantages of the invention will be apparent from the following description.

SUMMARY OF THE INVENTION

The objects of the present invention are accomplished in general by providing a vessel of large size and integral molded construction comprising a cylindric wall having a longitudinal center axis, and enclosing end walls disposed substantially perpendicularly to said axis at each extreme of said cylindric wall and adapted to define an enclosed space therewith. A depressed well which communicates with the interior of said vessel and extends below the vessel is positioned at the forward end of said cylindric wall as a continuous integral appendage thereof. An opening through the cylindric wall is centered where a line passing through the center of said well and perpendicularly through said longitudinal axis would intersect the opposing upper portion of the cylindric wall. A pedestal is positioned adjacent each end of the vessel at a site underneath the bottom portion of the cylindric wall. The pedestal at the rear of the vessel extends downwardly from the cylindric wall for a further distance than the distance of downward extension of the pedestal at the front of the vessel, and both pedestals extend further downwardly than distance of extension of the well from the cylindric wall. The cross sectional configuration of the cylindric wall in a plane perpendicular to the axis is circular, eliptical or of other curvilinear closed loop contour having symmetry about the longitudinal axis. The vessel is preferably fabricated of a moldable synthetic resin which is inert to hydrocarbon liquids.

BRIEF DESCRIPTION OF THE DRAWING

In the accompanying drawing forming a part of this specification and in which similar numerals of reference indicate corresponding parts in all the figures of the drawing.

DESCRIPTION OF THE PREFERRED EMBODIMENTS

Figure 1:
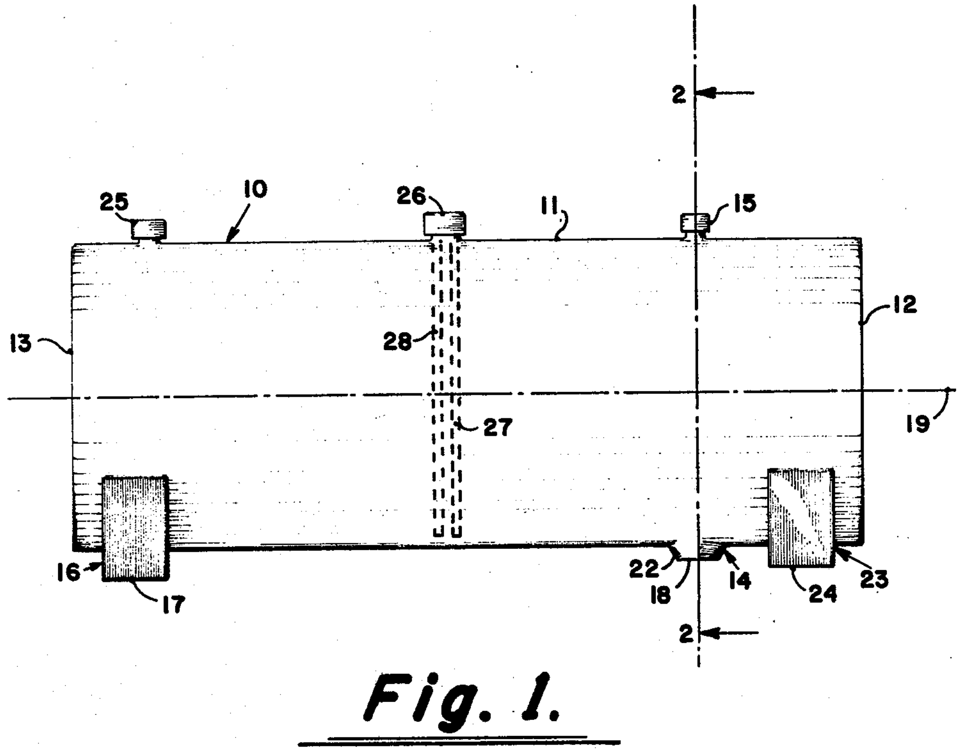
FIG. 1 is a side view of an embodiment of storage vessel of this invention.
Figure 2:
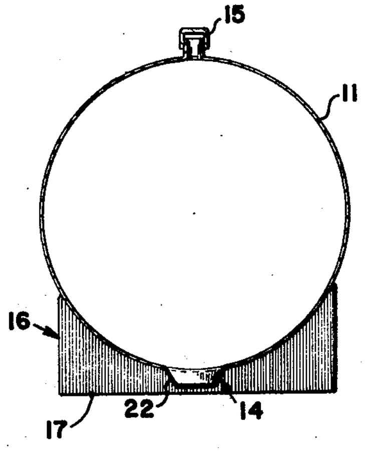
FIG. 2 is a transverse sectional view taken along the line 2—2 of FIG. 1.
Figure 3:
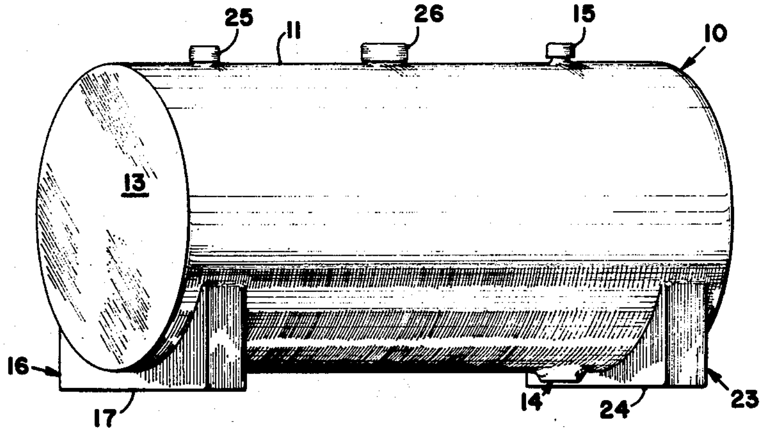
FIG. 3 is a perspective view of the vessel of FIG. 1.

Referring to FIG. 1, a storage vessel 10 of the present invention is shown consisting of cylindric wall 11 of circular cross sectional configuration, front end wall 12, rear end wall 13, well 14, access port 15 positioned directly above well 14, rear pedestal 16 located adjacent rear end wall 13, and front pedestal 23, located adjacent front end wall 12. The lowermost portion 17 of pedestal 16 extends a further distance from cylindric wall 11 than the lowermost portion 24 of pedestal 23, which in turn extends a further distance than lowermost portion 18 of well 14. In view of the dimensional interrelationship between lowermost portions 17, 18 and 24, the vessel, when rested on a horizontal flat surface, will be tilted at an angle such that the rear end will be higher than the front end, and the vessel will not be resting on well 14.

Access port 15 may serve the multiple purposes of facilitating entrance and removal of liquid, venting air or vapors, gaging of liquid level, and permitting sludge removal as will be hereinafter described. However, said several purposes might also be served by optional separate means such as vent port 25 and fill port 26 with depending removal pipe 27 and return pipe 28 shown in broken lines.

Figure 4:
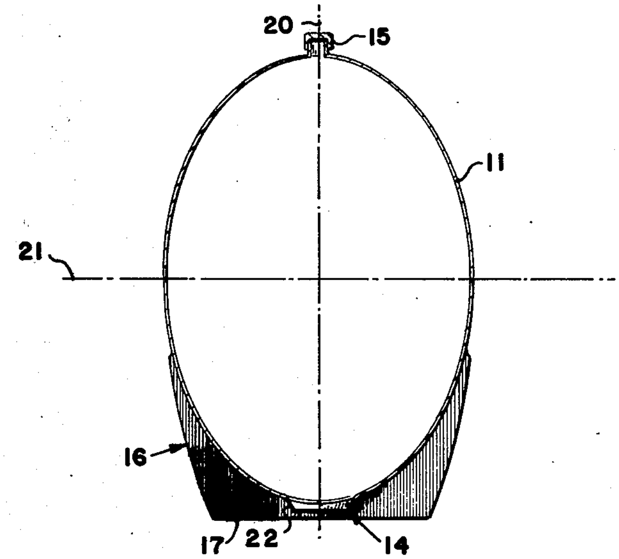
FIG. 4 is a transverse sectional view of another embodiment of storage vessel of this invention.

FIG. 4 shows an embodiment wherein the cylindric wall 11 has an ellipsoidal configuration characterized in having perpendicularly intersecting axes of symmetry oriented such that the long axis 20 is vertically disposed and the short axis 21 is horizontally disposed.

The term "cylindric wall" as employed herein is intended to denote a wall having a surface which may be geometrically defined as a closed right cylindric surface, namely a surface traced by a straight line moving parallel to a fixed straight line and continually and perpendicularly intersecting a fixed closed curve. The moving line, or generator, in any one of its positions is called an element of the surface. The guiding curve is called the directrix. The cross-sectional configuration of the cylindric wall, taken in planes perpendicular to the center longitudinal axis 19 is therefore constant and congruent to the directrix, which in the present invention is limited to closed loop curves having at least two axes of symmetry. In particularly preferred embodiments the ratio of the length of the longer axis 20 to the shorter axis 21 of said cross-section will fall between 1.0 and 2.0.

The length of the cylindric wall of the vessels of this invention may range from about 5 feet to 15 feet. The length of the longer axis of symmetry of the cross-sectional configuration of the cylindric wall may range from about 3 to 5 feet. Each end wall member may be flat, or convex in a direction pointing away from the vessel. The thickness of all the walls of the vessel will be uniform and generally in the range of about $\frac{1}{8}$" to $\frac{1}{2}$".

When rested on a flat horizontal surface or support bed, the tilted configuration of the vessels of this invention causes gravimetric migration of sedimentary material in the direction of the well. The amount of tilt incorporated into the design of the vessel should be within the range of about 3 degrees to 10 degrees measured between the longitudinal axis 19 and a horizontal line. It has been found that angles of tilt less than about 3 degrees do not provide adequate effect, whereas angles greater than 10 degrees may produce excess unbalanced stresses on the filled vessel.

The well is designed to depend from the bottom of the cylindrical wall as a continuous integral appendage thereof. The volumetric capacity of the well ranges from about 0.5% to 1.0% of the total capacity of the vessel. The shape of the well is such that its side portions 22 taper convergingly and downwardly toward lowermost portion 18.

The pedestal 16 may be formed as an integral part of the vessel, but is preferably formed as a separately added structure of hollow or solid configuration. The pedestal engages at least 15% of the periphery of the lower portion of the cylindric wall, serving in certain embodiments to stabilize the vessel toward sideways tilting movement. The lowermost portions 17 and 24 of the pedestals are elongated flat surfaces generally of rectangular configuration and disposed in perpendicular relationship to longitudinal axis 19. In some embodiments, said flat surfaces may be angled to match the angle of tilt of the vessel.

The access port 15, positioned directly above the center of well 14 is provided with closure means which serve to exclude admission of undesired material to the vessel and prevent loss of vapors therefrom. The port 15 serves to permit insertion of a pipe to the bottom of well 14, in which position said pipe is utilized in conjunction with suction means to remove accumulated sludge from the well. In the preferred underground disposition of the vessels of this invention, an extension snorkel pipe may be utilized to effectively extend port 15 upwards to an above-ground terminus.

The vessel of this invention may be fabricated by blow molding methods as described on page 246 of Modern Plastics Encyclopedia Vol. 52, No. 10A, 1975–76, or fabricated by rotational molding techniques as described on page 377 of the same Encyclopedia. Suitable plastics which may be utilized include high density and cross-linked polyethylene, Nylon 6, and other thermoplastic resins, some of which may be admixed with fiberglass. General methods of tank fabrication and selection of polymer are presented at some length in pages 42–45 of Modern Plastics, April 1977. Following fabrication, the interior of the vessel may be treated with gaseous fluorine or other agents which will impart improved resistance to hydrocarbon liquids. Because of its integral, substantially monolithic construction, the vessel is not prone to leaking.

While particular examples of the present invention have been shown and described, it is apparent that changes and modifications may be made herein without departing from the invention in its broadest aspects. The aim of appended claims, therefore, is to cover all such changes and modifications as fall within the true spirit and scope of the invention.

Having thus described my invention, what is claimed is:

1. A vessel of large size and integral molded construction comprising a cylindric wall having a longitudinal center axis, said vessel being horizontally disposed with respect to said center axis enclosing end walls disposed substantially perpendicularly to said axis at each extreme of said cylindric wall and adapted to define an enclosed space therewith, a depressed well positioned adjacent the forward extreme of the underside of said cylindric wall as a continuous integral appendage thereof communicating with the interior of said vessel and extending below said cylindric wall, an opening through the cylindric wall centered where a line passing through the center of said well and perpendicularly intersecting said longitudinal axis would intersect the opposing, upper portion of the cylindric wall, a first pedestal positioned at the underside of said vessel adjacent its rear extreme, said pedestal extending downwardly from the cylindric wall and terminating in a lowermost portion having the form of an elongated flat surface disposed in perpendicular relationship to said longitudinal axis, a second pedestal positioned at the underside of said vessel adjacent its forward extreme and extending downwardly from the cylindric wall to a lowermost portion located closer to said wall than the corresponding lowermost portion of said first pedestal and further from said wall than the lowermost portion of said well, said well being located between said first and second pedestals at a location closer to said second pedestal, said location defining sludge accumulation means such that the vessel, when rested on a horizontal flat surface, will be tilted downwardly toward said well at an angle within the range of 3 to 10 degrees measured between said longitudinal axis and a horizontal line causing sedimentary material to drain toward said well and accumulate therein, and the lowermost portion of said well will not contact said horizontal flat surface.

2. The vessel of claim 1 having a volumetric capacity of between 275 and 1,000 gallons, comprised of a synthetic polymer inert to hydrocarbons and fabricated as an integral monolithic structure by blowmolding or rotomolding.

3. The vessel of claim 2 wherein the cross section of said cylindric wall taken in a plane perpendicular to said longitudinal axis is substantially uniform throughout the length of said cylindric wall and possesses a curvilinear closed loop configuration having at least two axes of symmetry.

4. The vessel of claim 3 wherein the ratios of the lengths of said axes of symmetry are such that, when a longer and shorter axis exists the ratio of the longer axis to the shorter axis will fall between 1.0 and 2.0.

5. The vessel of claim 1 having means whereby liquid can be entered into and removed from said tank, said means being at an elevation above the lowermost portion of said depressed well.

6. The vessel of claim 5 wherein said well is comprised of side portions that taper convergingly and downwardly toward said lowermost portion.

* * * * *